US012511095B2

(12) United States Patent
Lubold et al.

(10) Patent No.: US 12,511,095 B2
(45) Date of Patent: Dec. 30, 2025

(54) SYSTEM AND METHOD FOR TARGETED CROWD-BASED ACOUSTIC-PROSODIC AND LINGUISTIC ACCOMMODATION

(71) Applicant: HONEYWELL INTERNATIONAL INC., Charlotte, NC (US)

(72) Inventors: Nichola Lubold, Phoenix, AZ (US); Tor Finseth, Plymouth, MN (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 410 days.

(21) Appl. No.: 18/062,279

(22) Filed: Dec. 6, 2022

(65) Prior Publication Data
US 2024/0184508 A1   Jun. 6, 2024

(51) Int. Cl.
| | |
|---|---|
| G06F 3/16 | (2006.01) |
| G06V 40/16 | (2022.01) |
| G10L 15/26 | (2006.01) |
| G10L 25/63 | (2013.01) |
| G10L 25/90 | (2013.01) |

(52) U.S. Cl.
CPC .............. *G06F 3/16* (2013.01); *G06V 40/171* (2022.01); *G06V 40/174* (2022.01); *G10L 15/26* (2013.01); *G10L 25/63* (2013.01); *G10L 25/90* (2013.01)

(58) Field of Classification Search
CPC ...... G06F 3/16; G06V 40/174; G06V 40/171; G10L 15/26; G10L 25/63; G10L 25/90
See application file for complete search history.

(56) References Cited

U.S. PATENT DOCUMENTS 7,340,393 B2   3/2008   Mitsuyoshi
7,412,390 B2   8/2008   Kobayashi et al.
(Continued)

FOREIGN PATENT DOCUMENTS

| JP | 2005-70430 A | 3/2005 |
| WO | 2008142836 A1 | 8/2010 |
| WO | 2019188469 A2 | 6/2019 |

OTHER PUBLICATIONS

Butler, Brooks A., et al., "Classifying Crowd Behavior at Collegiate Basketball Games Using Acoustic Data," 176th Meeting of Acoustical Society of America, 2018 Acoustics Week in Canada, Nov. 5-9, 2018, Signal Processing in Acoustics: Paper 1pSP11, 2019 Acoustical Society of America. https://doi.org/10.1121/2.000106, Proceedings of Meetings on Acoustics, vol. 35, 055006 (2019).
(Continued)

*Primary Examiner* — Bhavesh M Mehta
*Assistant Examiner* — Eunice Lee
(74) *Attorney, Agent, or Firm* — Ingrassia Fisher & Lorenz LLP

(57) ABSTRACT

A system and method for providing targeted crowd-based acoustic-prosodic and linguistic accommodation includes simultaneously detecting, with a multimedia device, individual facial images of a plurality of individuals and acoustic sounds from the plurality of individuals. Message data representative of an audible message supplied to the plurality of individuals is supplied to the processing system, the message data. In the processing system: a plurality of facial features and a plurality of acoustic-related features are extracted from the multimedia data; the facial features and the acoustic-related features are processed to determine an aggregate emotional state of the plurality of individuals; one or more acoustic-prosodic features of the audible message and/or a content of the audible message are selectively manipulated based on the determined aggregate emotional state of the plurality of individuals to generate an updated audible message; and the updated audible message is output.

10 Claims, 2 Drawing Sheets

(56) References Cited

U.S. PATENT DOCUMENTS

| | | | |
|---|---|---|---|
| 8,640,021 | B2 | 1/2014 | Perez et al. |
| 10,095,918 | B2 | 10/2018 | Gil et al. |
| 10,276,149 | B1 | 4/2019 | Liang et al. |
| 10,276,185 | B1 | 4/2019 | Ma et al. |
| 10,521,807 | B2 | 12/2019 | Sardella |
| 10,796,176 | B2 | 10/2020 | el Kaliouby et al. |
| 10,943,604 | B1* | 3/2021 | Bone ............... G10L 17/04 |
| 11,079,913 | B1 | 8/2021 | Kim et al. |
| 11,270,699 | B2 | 3/2022 | Penilla et al. |
| 2005/0190061 | A1* | 9/2005 | Trela ............. G08B 25/016 340/573.1 |
| 2012/0116186 | A1* | 5/2012 | Shrivastav ......... G10L 25/48 600/301 |
| 2014/0280529 | A1* | 9/2014 | Davis ............. H04L 67/535 709/204 |
| 2015/0195406 | A1* | 7/2015 | Dwyer ........... G06F 21/6254 379/265.07 |
| 2017/0176202 | A1* | 6/2017 | Anderson ......... G01C 21/3492 |
| 2020/0064146 | A1* | 2/2020 | Kitajima .......... G01C 21/3608 |
| 2021/0253255 | A1* | 8/2021 | Johnson ............. B60R 22/48 |
| 2023/0048098 | A1* | 2/2023 | Lam ................ G10L 25/63 |

OTHER PUBLICATIONS

Quach, Kha Gia, et al., "Non-Volume Preserving-based Fusion to Group-Level Emotion Recognition on Crowd Videos," Journal of Pattern Recognition, arXiv:1811.11849v4 [cs.CV] Mar. 23, 2022.

Quiroz, M.; Patiño, R.; Diaz-Amado, J.; Cardinale, Y., "Group Emotion Detection Based on Social Robot Perception." Sensors 2022, 22, 3749. https://doi.org/10.3390/s22103749, Published May 14, 2022.

Perez, Alejandro, et al., "Brain-to-Brain Entrainment: EEG Interbrain Synchronization While Speaking and Listening," Scientific Reports, 7, Article No. 4190, Published Jun. 23, 2017.

Mukherjee, Sankar, et al. "The Neural Oscillatory Markers of Phonetic Convergence During Verbal Interaction," Hum Brain Mapp. 2019;40:187-201, wileyonlinelibrary.com/journal/hbm, DOI: 10.1002/hbm.24364, Aug. 5, 2018.

Dumas G, Nadel J, Soussignan R, Martinerie J, Garnero L (2010) "Inter-Brain Synchronization during Social Interaction." PLoS ONE 5(8): e12166.doi:10.1371/journal.pone.0012166, Aug. 17, 2010.

Lee, Chi-Chun, et al., "Computing Vocal Entrainment: A Signal-Derived PCA-based Quantification Scheme with Application to Affect Analysis in Married Couple Interactions," Computer Speech and Language 28 (2014) 518-539, Jun. 22, 2012.

Dikker, Suzanne, "Brain-to-Brain Synchrony Tracks Real-World Dynamic Group Interactions in the Classroom," Current Biology 27, 1375-1380, May 8, 2017.

Berlonghi, Alexander E., "Understanding and Planning for Different Spectator," Safety Science 18 (1995) 239-247.

Urbanelli Angelica et al.; "A Chatbot for Citizens' Awareness and Engagementt in Disaster Risk Reduction"; Jul. 14, 2023, pp. 1-22; XP093141070 URL:https://papers.ssrn.com/sol3/papers.cfm?abstract_id=4510058.

* cited by examiner

SYSTEM AND METHOD FOR TARGETED CROWD-BASED ACOUSTIC-PROSODIC AND LINGUISTIC ACCOMMODATION

TECHNICAL FIELD

The present disclosure generally relates to crowd responses to messages and, more particularly, to a system and method for providing targeted crowd-based acoustic-prosodic and linguistic accommodation.

BACKGROUND

Announcements made to crowds, such as a group of passengers on an aircraft, can fall short of achieving the desired goal or impact on crowd behavior. This can be due several reasons including, for example, the ambient noise conditions, the mood of the crowd, and how the audience perceives the announcement. Monitoring and adapting messaging to the crowd can improve responses and facilitate managing of large groups.

In the context of a passenger aircraft, one of the extraneous, but necessary, tasks that pilots must handle is managing passenger expectations and communicating with passengers effectively. This can lead to increased pilot workload, especially for single pilot operations. As may be appreciated, alleviating pilot workload can increase successful single pilot operations.

Hence, there is a need for a system and method that can alleviate pilot workload, while simultaneously assisting in the management of passenger expectations and effectively communicating with passengers. The present disclosure addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a system for providing targeted crowd-based acoustic-prosodic and linguistic accommodation includes a multimedia device and a processing system. The multimedia device is configured to simultaneously detect individual facial images of a plurality of individuals and acoustic sounds from the plurality of individuals and to supply multimedia data representative of the facial images and the acoustic sounds. The processing system is coupled to receive the multimedia data and is further coupled to receive message data representative of an audible message supplied to the plurality of individuals. The processing system is configured to: extract a plurality of facial features and a plurality of acoustic-related features from the multimedia data; process the facial features and the acoustic-related features to determine an aggregate emotional state of the plurality of individuals; selectively manipulate one or more acoustic-prosodic features of the audible message and/or a content of the audible message based on the determined aggregate emotional state of the plurality of individuals to generate an updated audible message; and output the updated audible message.

In another embodiment, a method for providing targeted crowd-based acoustic-prosodic and linguistic accommodation includes simultaneously detecting, with a multimedia device, individual facial images of a plurality of individuals and acoustic sounds from the plurality of individuals. The multimedia data representative of the facial images and the acoustic sounds are supplied to a processing system. Message data representative of an audible message supplied to the plurality of individuals is supplied to the processing system, the message data. In the processing system: a plurality of facial features and a plurality of acoustic-related features are extracted from the multimedia data; the facial features and the acoustic-related features are processed to determine an aggregate emotional state of the plurality of individuals; one or more acoustic-prosodic features of the audible message and/or a content of the audible message are selectively manipulated based on the determined aggregate emotional state of the plurality of individuals to generate an updated audible message; and the updated audible message is output.

In yet another embodiment, an aircraft system for providing targeted passenger-based acoustic-prosodic and linguistic accommodation includes a multimedia device and a processing system. The multimedia device is configured to simultaneously detect individual facial images of a plurality of aircraft passengers in an aircraft cabin and acoustic sounds from the plurality of aircraft passengers and to supply multimedia data representative of the facial images and the acoustic sounds. The processing system is coupled to receive the multimedia data and is further coupled to receive message data representative of an audible message supplied to the plurality of aircraft passengers. The processing system is configured to: extract a plurality of facial features and a plurality of acoustic-related features from the multimedia data; process the facial features and the acoustic-related features to determine an aggregate emotional state of the plurality of aircraft passengers; selectively manipulate one or more acoustic-prosodic features of the audible message and/or a content of the audible message based on the determined aggregate emotional state of the plurality of aircraft passengers to generate an updated audible message; and output the updated audible message.

Furthermore, other desirable features and characteristics of the system for providing targeted crowd-based acoustic-prosodic and linguistic accommodation will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
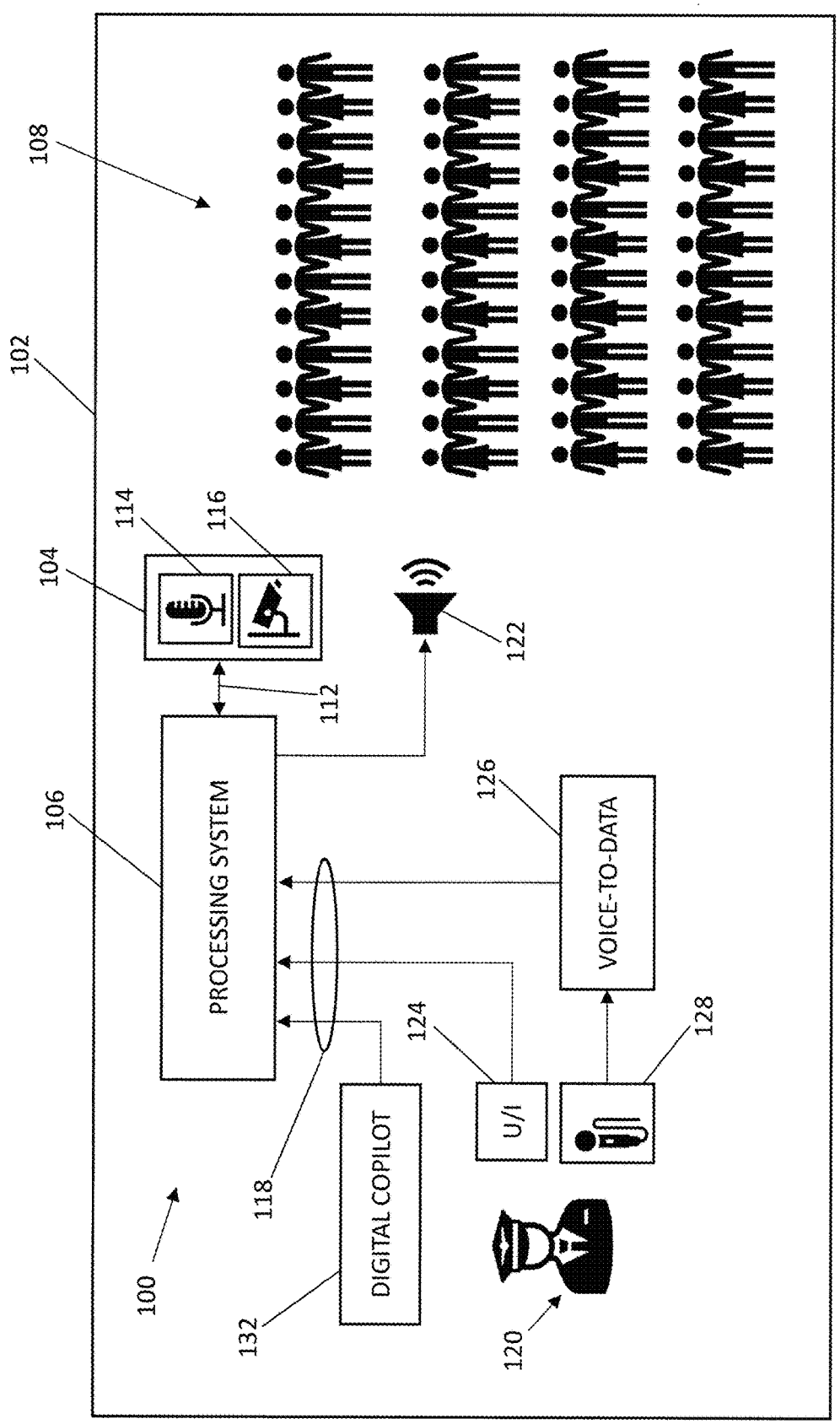
FIG. 1 depicts a functional block diagram of one embodiment of a system for providing targeted crowd-based acoustic-prosodic and linguistic accommodation.

Referring to FIG. 1, a functional block diagram of one embodiment of a system for providing targeted crowd-based acoustic-prosodic and linguistic accommodation is depicted. In the depicted embodiment, the system 100 is implemented in an aircraft 102. It will be appreciated, however, that the system 100 may be implemented in numerous other environments where it is desirable to drive the intended behavioral response of a plurality of individuals.

Regardless of where the system 100 is specifically implemented, it includes at least a multimedia device 104 and a processing system 106. The multimedia device is configured to simultaneously detect individual facial images of a plurality of individuals 108 and acoustic sounds from the plurality of individuals 108. The multimedia device 104 is additionally configured to supply multimedia data 112 representative of the facial images and the acoustic sounds to the processing system 106. It will be appreciated that the multimedia device 104 may be variously configured and implemented. For example, it may be an integrated device or comprise separate components. In the depicted embodiment, the multimedia device 104 comprises at least one microphone 114 and at least one camera 116. The at least one microphone 114 is configured to detect the acoustic sounds from the plurality of individuals 108, and the at least one camera 116 is configured to detect the individual facial images of the plurality of individuals 108.

The processing system 106 may include one or more processors and computer-readable storage devices or media encoded with programming instructions for configuring the processing system 106. The one or more processors may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller.

The processing system 106 is coupled to receive the multimedia data 112. The processing system 106 is configured to extract a plurality of facial features and a plurality of acoustic-related features from the multimedia data 112. The processing system 106 processes the extracted facial features and the acoustic-related features to determine the aggregate emotional state of the plurality of individuals 108. It will be appreciated that the processing system 106 may implement any one of numerous known processes for determining the aggregate emotional state of the plurality of individuals 108. Some example processes for doing are disclosed in "Non-volume preserving-based fusion to group-level emotion recognition on crowd videos," authored by Quach, K. G., Le, N., Duong, C. N., Jalata, I., Roy, K., & Luu, K., and published in Pattern Recognition, Volume 128, 108646(2022), and in "Group Emotion Detection Based on Social Robot Perception," authored by Quiroz M., Patiño, R., Diaz-Amado, J., & Cardinale, Y., and published in Sensors, 22(10), 3749 (2022). Both of these publications are incorporated herein by reference in their entirety.

The processing system 106 is further coupled to receive message data 118 that is representative of an audible message supplied to the plurality of individuals 108. The processing system 106 is further configured, based on the determined aggregate emotional state of the plurality of individuals, to selectively manipulate one or more acoustic-prosodic features of the audible message (e.g., pitch, intensity, speaking rate, jitter, shimmer) and/or manipulate the content of the audible message, thereby generating an updated audible message. The processing system 106 then outputs the updated audible message.

In some embodiments, the processing system 106 is additionally configured to process the message data 118 to determine the context of the audible message. For example, to determine whether the audible message is an emergency message, general announcement, etc. The processing system 106, based on the context of the audible message, then determines the intended response by the plurality of individuals 108 to the audible message.

In order to output the audible message, and the updated audible message(s), it is seen that the processing system 106, at least in the depicted embodiment, includes an audio generator 122. The audio generator 122, which may be, for example, a speaker, is configured to emit audible sounds representative of the initial audible message and the updated audible message.

It will be appreciated that the message data 118 may be generated manually or automatically. If generated manually, the message data 188 may be input by a user 120 (e.g., a pilot) via a user interface 124 (e.g., keyboard, touchscreen, etc.). In other embodiments, the message data 118 may be generated using a voice-to-data module 126 that is configured to convert spoken words into the message data 118 and supply the message data 118 to the processing system. In such embodiments, the system 100 may additionally include an audio capture device 128, such as a microphone, into which the user 120 (e.g., pilot) speaks.

If the message data 118 is generated automatically, it may be done so by an external system. For example, in the embodiment depicted in FIG. 1, a digital copilot 132 is configured to automatically generate the message data 118.

Figure 2:
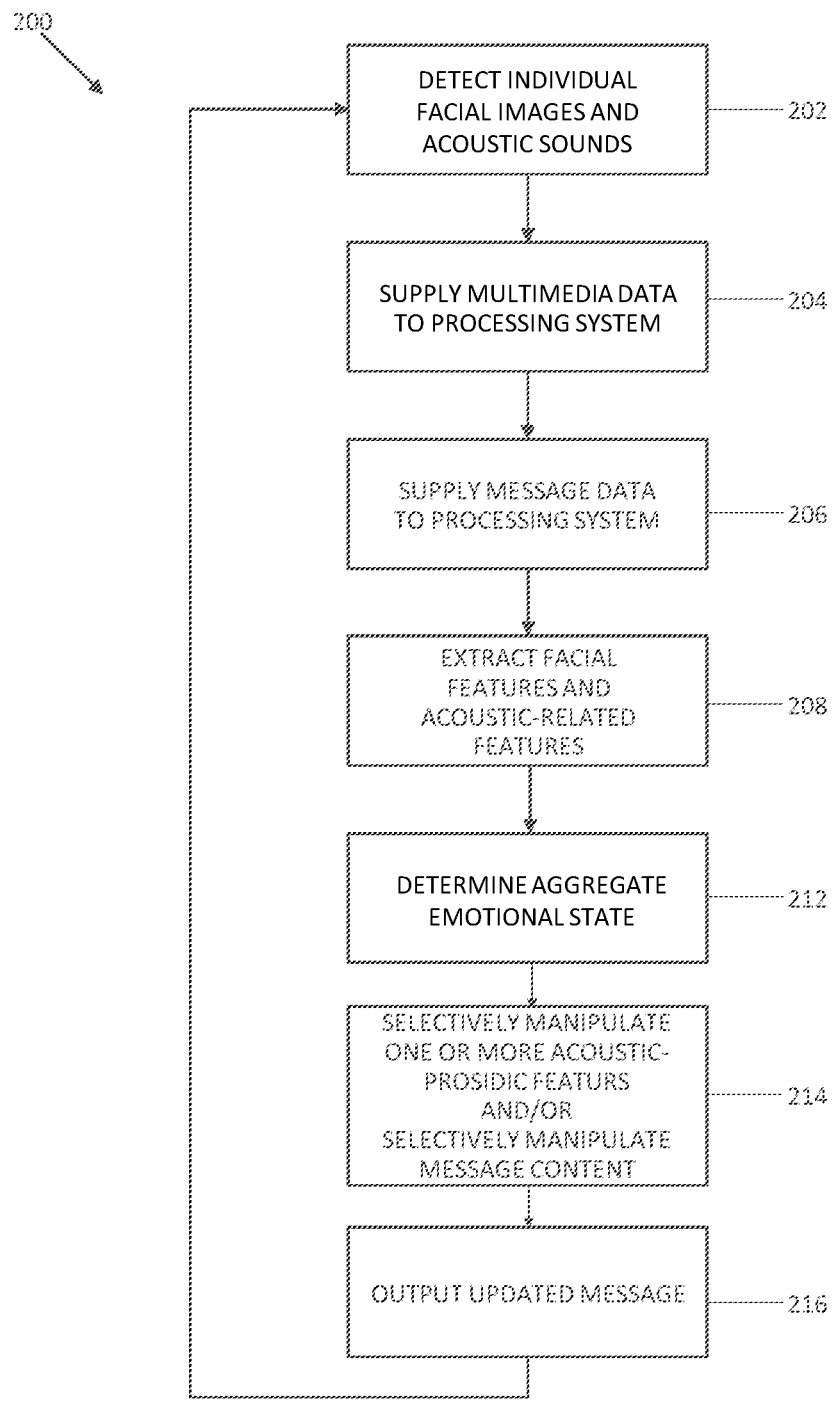
FIG. 2 depicts a process flowchart of an example process for providing targeted crowd-based acoustic-prosodic and linguistic accommodation using the system of FIG. 1.

Referring now to FIG. 2, a process flowchart is depicted of an example process 400 for providing real-time feedback of remote collaborative communication. The order of operation within the process 200 is not limited to the sequential execution as illustrated in the figure, but may be performed in one or more varying orders as applicable and in accordance with the present disclosure.

The example process 200 includes simultaneously detecting, with the multimedia device 104, the individual facial images of the plurality of individuals and acoustic sounds from the plurality of individuals (202). The multimedia data representative of the facial images and the acoustic sounds is then supplied to the processing system 106 (204). The message data is also supplied to the processing system 106 (206).

In the processing system 106, a plurality of facial features and a plurality of acoustic-related features are extracted from the multimedia data 118 (208). The facial features and the acoustic-related features are processed to determine an aggregate emotional state of the plurality of individuals 108 (212). One or more of the acoustic-prosodic features of the audible message is then selectively manipulated based on the determined aggregate emotional state of the plurality of individuals (214). In addition, or instead, the content of the audible message is selectively manipulated based on the determined aggregate emotional state of the plurality of individuals (214). An updated audible message is then output (216).

The system and method described herein improves the desired impact of automated and man-made announcements on crowd behavior through an adaptive, digital system. The system adapts messaging to the emotional state of the crowd and ambient noise environment. Based on the detected mood and environment, the system and method described herein automatically modifies the acoustic-prosodic properties of messages that are output through a speaker system, with the goal of driving intended behavioral responses. The system can be used to deliver negative news (e.g., delayed/cancelled flight, longer estimated time of arrival, turbulence), increase the perceived empathy of the speaker if the crowd is displaying negative emotions, or help conflict de-escalation between crew and passengers.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft system for providing targeted passenger-based acoustic-prosodic and linguistic accommodation, the system comprising:

a multimedia device configured to simultaneously detect individual facial images of a plurality of aircraft passengers in an aircraft cabin and acoustic sounds from the plurality of aircraft passengers and to supply multimedia data representative of the facial images and the acoustic sounds; and a processing system coupled to receive the multimedia data, the processor further coupled to receive message data representative of an audible message supplied to the plurality of aircraft passengers, the processing system configured to:
extract a plurality of facial features and a plurality of acoustic-related features from the multimedia data;
process the facial features and the acoustic-related features to determine an aggregate emotional state of the plurality of aircraft passengers;
selectively manipulate one or more acoustic-prosodic features of the audible message and a content of the audible message based on the determined aggregate emotional state of the plurality of aircraft passengers to generate an updated audible message; and
output the updated audible message.

2. The system of claim 1, wherein the processing system further comprises an audio generator configured to emit audible sounds representative of the audible message and the updated audible message.

3. The system of claim 1, wherein the message data is generated automatically.

4. The system of claim 3, wherein the message data is generated automatically by a digital copilot.

5. The system of claim 1, wherein the message data is input by a user.

6. The system of claim 1, further comprising:
a voice-to-data module configured to convert spoken words into the message data and supply the message data to the processing system.

7. The system of claim 1, wherein the one or more acoustic-prosodic features of the audible message comprise one or more of: pitch, intensity, speaking rate, jitter, and shimmer.

8. The system of claim 1, wherein the processing system is further configured to process the message data to determine a context of the audible message and, from the context, determine an intended response to the message by the plurality of aircraft passengers.

9. The system of claim 1, wherein the multimedia device comprises:
at least one microphone configured to detect the acoustic sounds from the plurality of aircraft passengers; and
at least one camera configured to detect the individual facial images of the plurality of aircraft passengers.

10. An airport system for providing targeted passenger-based acoustic-prosodic and linguistic accommodation, the system comprising:

a multimedia device configured to simultaneously detect individual facial images of a plurality of aircraft passengers in an aircraft terminal and acoustic sounds from the plurality of aircraft passengers and to supply multimedia data representative of the facial images and the acoustic sounds; and a processing system coupled to receive the multimedia data, the processor further coupled to receive message data representative of an audible message supplied to the plurality of aircraft passengers, the processing system configured to:
extract a plurality of facial features and a plurality of acoustic-related features from the multimedia data;

process the facial features and the acoustic-related features to determine an aggregate emotional state of the plurality of aircraft passengers;

selectively manipulate one or more acoustic-prosodic features of the audible message and a content of the audible message based on the determined aggregate emotional state of the plurality of aircraft passengers to generate an updated audible message; and output the updated audible message.

* * * * *